(12) United States Patent
Chen

(10) Patent No.: US 9,385,614 B2
(45) Date of Patent: Jul. 5, 2016

(54) SWITCHING POWER SUPPLY

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 501 days.

(21) Appl. No.: 13/895,309

(22) Filed: May 15, 2013

(65) Prior Publication Data
US 2013/0343097 A1 Dec. 26, 2013

(30) Foreign Application Priority Data

Jun. 20, 2012 (JP) ................................ 2012-138556

(51) Int. Cl.
*H02M 3/335* (2006.01)
*H02M 1/00* (2006.01)

(52) U.S. Cl.
CPC ...... *H02M 3/33515* (2013.01); *H02M 3/33507* (2013.01); *H02M 2001/0035* (2013.01); *H02M 2001/0058* (2013.01); *Y02B 70/1491* (2013.01)

(58) Field of Classification Search
CPC .................... H02M 3/33515; H02M 3/33507; H02M 2001/0058; H02M 1/36
See application file for complete search history.

(56) References Cited

U.S. PATENT DOCUMENTS

| 8,310,160 | B1* | 11/2012 | Xiong | H05B 41/2855 315/120 |
| 2004/0217750 | A1* | 11/2004 | Brown | G06F 1/263 323/299 |
| 2004/0257005 | A1* | 12/2004 | Poehlman | H05B 41/2985 315/291 |
| 2005/0270804 | A1* | 12/2005 | Liu | H02M 1/36 363/16 |
| 2009/0122934 | A1* | 5/2009 | Ferrari | H04L 27/00 375/354 |
| 2012/0320640 | A1* | 12/2012 | Baurle | H02M 3/33507 363/21.17 |

FOREIGN PATENT DOCUMENTS

JP 2011-015570 A 1/2011

* cited by examiner

*Primary Examiner* — Jessica Han
(74) *Attorney, Agent, or Firm* — Rabin & Berdo, P.C.

(57) ABSTRACT

A switching power supply achieves simultaneously achieves suppression of surge voltage and satisfactory transient response. The switching power supply comprises a switching element connected to a primary winding of an isolation transformer, a resonance capacitor connected to the switching element, an output capacitor connected to a secondary winding of the isolation transformer through a rectifying diode, and a control circuit ON/OFF driving the switching element. The control circuit includes a restart circuit that delivers a restart signal to turn ON the switching element after a predetermined time from turning OFF of the switching element has passed. The control circuit also includes an initial operation setting circuit that sets a delay time in the restart circuit to be longer in a start up period of the power supply than in a normal operation time after the end of the startup period.

10 Claims, 5 Drawing Sheets

SWITCHING POWER SUPPLY

CROSS-REFERENCE TO RELATED APPLICATION

This application is based on, and claims priority to, Japanese Patent Application No. 2012-138556, filed on Jun. 20, 2012, contents of which are incorporated herein by reference.

BACKGROUND OF THE INVENTION

1. Field of the Invention

The present invention relates to a switching power supply, and in particular, to a quasi-resonance type switching converter that achieves reduction of surge voltage undergone by a rectifying diode and simultaneously ensures transient response.

2. Description of the Related Art

Quasi-resonance type switching converters are widely used for low power switching power supplies. This type of switching power supply, for example disclosed in Patent Document 1 (identified below), has a construction shown in FIG. 4. The switching power supply 1 of FIG. 4 comprises a switching element Q, which can be a MOS-FET, connected in series to a primary winding P1 of an isolation transformer T that receives an input voltage Vi, and a resonance capacitor Cr provided in parallel to the switching element Q. The switching power supply 1 also comprises an output capacitor Co connected through a rectifying diode D to a secondary winding S of the transformer T, and a control circuit 2 that is a control IC, for ON/OFF driving the switching element Q.

The control circuit 2 controls the process in which the switching element Q is turned ON to store electric energy from the input voltage Vi into the isolation transformer T, then the switching element Q is turned OFF to discharge the electric energy stored in the isolation transformer T from the secondary winding S of the isolation transformer T. Thus, output voltage Vo is obtained by rectification and smoothing with the rectifying diode D and the output capacitor Co.

The control circuit 2 receives a feedback voltage FB through a feedback circuit 3 including a photo-coupler; in which the FB voltage is a piece of information about the output voltage Vo detected by voltage dividing resistors Ro1 and Ro2. The control circuit 2 also receives an IS voltage that is detected through a shunt resistor Rs and corresponds to the current flowing through the switching element Q. The control circuit 2 further receives a ZCD voltage developed across an auxiliary winding P2 of the isolation transformer T accompanying ON/OFF operation of the switching element Q.

The control circuit 2 has a first comparator 12, a bottom voltage detecting circuit that compares the ZCD voltage given through a level-shift and delay circuit 11 with a reference voltage Vref1 and detects a bottom of the voltage developing at the isolation transformer T or, in other words, voltage undergone by the switching element Q, delivering a BOT signal. The control circuit 2 also has a second comparator 13, a current comparator, that compares the IS voltage with the FB voltage and, if the IS voltage has exceeded the FB voltage, delivers a reset signal. The control circuit 2 further has a third comparator 14 that delivers a reset signal when the FB voltage has decreased below a reference voltage Vref2. The control circuit 2 comprises an RS flip-flop 15 that is set by the BOT signal and reset by the reset signal, and delivers an output signal q. The output signal q is basically used as a control signal for ON driving the switching element Q through the driving circuit 16 when the RS flip-flop 15 is set and the output signal q is in an "H" state.

More specifically, the BOT signal is given through an inverter 17 to a clock terminal of a D flip-flop 18. This D flip-flop 18 is set by the BOT signal under the condition that the RS flip-flop 15 is reset, which means the switching element Q is in an OFF state. The set output of the D flip-flop 18 is given through an OR circuit 19 to the RS flip-flop 15, setting the RS flip-flop 15, to turn ON the switching element Q. Since the D flip-flop 18 sets the RS flip-flop 15 based on the BOT signal only when the RS-flip-flop 15 is reset, the D flip-flop 18 limits the maximum frequency of ON/OFF driving of the switching element Q.

With the ON operation of the switching element Q, the current flowing in the switching element Q through the isolation transformer T increases. When the IS voltage exceeds the FB voltage, the second comparator 13 delivers a reset signal. The reset signal is given to the RS flip-flop 15 through an OR circuit 20 resetting the RS flip-flop 15, to turn OFF the switching element Q. The third comparator 14 forcedly resets the RS flip-flop 15 through the OR circuit 20 when the FB voltage decreases in an event of abrupt load variation or burst operation.

The control circuit 2 is provided with a restart circuit 21 that sets the RS flip-flop 15 to resume ON/OFF drive of the switching element Q after continuation for a certain period of time Tres, 10 μs for example, in a state in which the output voltage Vo is abnormally decreased and the RS flip-flop 15 is reset, resulting in a halt of ON driving of the switching element Q.

The restart circuit 21 starts up when the switching element Q enters an OFF state in which the RS flip-flop 15 is in a reset state and the BOT signal is not delivered. After the period of time Tres, the restart circuit 21 delivers a restart signal to set the RS flip-flop 15. If the RS flip-flop 15 is set or the BOT signal is delivered during the operation period, the period of time Tres, of the restart circuit 21, the restart circuit 21 is initialized through an OR circuit 22. In other words, when the switching element Q is ON/OFF driven at an oscillation frequency in a specified range and consequently, the RS flip-flop 15 is set or the BOT signal is delivered, the restart circuit 21 is initialized. Therefore, the restart signal is never delivered as long as the switching element Q is ON/OFF driven at a specified oscillation frequency.

[Patent Document 1]
Japanese Unexamined Patent Application Publication No. 2011-015570.

At start up time of the switching power supply having the construction described above, the ZCD voltage is zero and thus, the RS flip-flop 15 is set according to the restart signal delivered by the restart circuit 21 to ON drive the switching element Q. When the IS voltage exceeds the FB voltage, the RS flip-flop 15 is reset to turn OFF the switching element Q. Thus, the output capacitor Co is charged with the electric energy discharged from the secondary winding S of the isolation transformer T.

In the startup period of the switching power supply, however, the charged voltage that is the output voltage Vo is approximately zero, resulting in an elongated discharge time Tdis, for example 100 μs, of discharging the electric energy from the secondary winding S. At this time, the BOT signal remains at the "L" level due to a low value of the ZCD voltage itself; thus the restart circuit 21 starts to operate correspondingly to reset of the RS flip-flop 15 accompanying the turning OFF of the switching element Q. After the period of time Tres, the restart circuit 21 delivers a restart signal again, which in turn sets the RS flip-flop 15 to turn ON the switching element Q.

At this moment of turning ON of the switching element Q, however, discharge of electric energy is not completed from the secondary winding S of the isolation transformer T, that is, Tres<Tdis, and a reverse recovery current is generated in the rectifying diode D. FIG. 5 illustrates waveforms of the drain voltage Vds of the switching element Q, the current Idiode through the rectifying diode D, and the anode voltage Vdiode of the rectifying diode D during a period of ON/OFF operation of the switching element Q. FIG. 5 clearly shows a large surge voltage Vsurge developed across the rectifying diode D.

In order to suppress the generation of surge voltage Vsurge, a means can be employed to set the restart period of time Tres to be longer than the discharge time Tdis, in which the period of time Tres is the time duration from a start up of the restart circuit 21 accompanying turning OFF of the switching element Q to delivery of a restart signal, and the time Tdis is a period of time for discharging the electric energy from the secondary winding S. Setting the period of time Tres to be long remarkably deteriorates transient response when the FB voltage becomes lower than the reference voltage Vref2 due to abrupt change in the load during normal operation after the end of a start up period of the switching power supply.

SUMMARY OF THE INVENTION

The present invention has been accomplished in view of these situations and an object of the invention is to provide a switching power supply with a simple construction that simultaneously achieves suppression of surge voltage subjected to a rectifying diode and satisfactory transient response.

To achieve the above stated object, a switching power supply of the present invention, which is of a quasi-resonance type, comprises a switching element Q connected in series to a primary winding P1 of an isolation transformer T applied with an input voltage Vi, a resonance capacitor Cr connected in parallel to the switching element, an output capacitor Co connected to a secondary winding S of the isolation transformer through a rectifying diode D, and a control circuit IC. The control circuit IC turns the switching element ON to store electric energy into the isolation transformer, then turns the switching element OFF to discharge the electric energy stored in the isolation transformer from the secondary winding of the isolation transformer, and operates to deliver an output voltage Vo rectified and smoothed through the rectifying diode and the output capacitor.

The control circuit includes a bottom voltage detecting circuit that detects a bottom of a voltage and delivers a bottom detecting signal (e.g., a BOT signal), wherein the voltage develops in the isolation transformer due to resonant oscillation caused by a leakage inductance of the isolation transformer and a capacitance of the resonance capacitor after discharge of the electric energy from the secondary winding.

The control circuit further includes a current comparator that delivers a reset signal when a voltage level, e.g. an IS voltage level, corresponding to a current flowing through the switching element, reaches a feedback voltage level, e.g. an FB voltage level, corresponding to the output voltage of an output circuit.

The control circuit further includes a flip-flop that is set by the bottom detection signal or a restart signal and reset by the reset signal, and generates a driving signal for ON/OFF driving the switching element.

The control circuit further includes a restart circuit that is reset when the flip-flop is set or the bottom detection signal is delivered, and starts operation when the flip-flop is reset in a condition without input of the bottom detection signal, thereby delivering the restart signal after a predetermined time Tres has passed.

The control circuit further includes an initial operation setting circuit that sets a delay time Tres in the restart circuit to be longer during a predetermined period of time in a start up period of the power supply than in a normal operation time after the end of the startup period.

The initial operation setting circuit may comprise a delay circuit that delivers an initial operation completion signal ST after the predetermined period of time, e.g. Tstart, 3 ms for example, from receiving a device starting signal has passed. The restart circuit may set a first time, 200 μs for example, determined based on anticipating a time Tdis required for completion of discharging of electric energy from the secondary winding as the delay time Tres, wherein the first time is in effect from a moment of delivering the restart signal in the initial operation period Tstart until receiving the initial operation completion signal ST. The restart circuit may set a second time, 10 μs for example, shorter than the first time as the delay time Tres, wherein the second time is in effect from a moment of delivering the restart signal, after receiving the initial operation completion signal ST.

Specifically, the restart circuit comprises a capacitor that is charged by a constant current source, a first switch that receives the bottom detection signal and discharges charges accumulated on the capacitor, a comparator that generates the restart signal when a charged voltage across the capacitor exceeds a predetermined reference voltage, and a second switch that receives the initial operation completion signal ST and increases an amount of current for charging the capacitor.

The initial operation setting circuit determines, as the predetermined period of time Tstart, a time based on anticipating an initial operation time in which the output voltage Vo in the startup period approaches a rated output voltage.

The bottom voltage detecting circuit detects a bottom of an oscillating voltage generated in the isolation transformer by means of a voltage developed in an auxiliary winding of the isolation transformer.

In the switching power supply device as stated above, the delay time Tres set in the restart circuit is determined to be longer than the discharge time Tdis for the electric energy to be discharged from the isolation transformer T, the Tdis time being equivalent to charging time on the output capacitor Co, in the startup period of the power supply device in which the charged voltage of the output capacitor Co or the output voltage Vo is at a low level. Therefore, the switching element Q is never turned ON in the condition wherein the rectifying diode D is subjected to a high voltage. The switching element Q is turned ON after completion of discharge of the electric energy from the isolation transformer T and the voltage subjected by the rectifying diode D has become zero. Therefore, the rectifying diode D does not generate a reverse recovery current and thus, no surge voltage Vsurge develops.

In the normal operation time after completion of the startup period of the power supply device, the delay time Tres set in the restart circuit is determined to be a shorter time taking transient response into account. Consequently, even if any abnormal decrease in the output voltage Vo occurs due to abrupt change in the load for example, the switching element Q is rapidly turned ON. Therefore, the transient response is satisfactorily quick. Thus, the switching power supply of the invention provides great advantages, simultaneously achieving suppression of surge voltage on the rectifying diode and quick transient response readily and effectively.

DETAILED DESCRIPTION OF THE INVENTION

The following describes a switching power supply according to an embodiment of the present invention with reference to the accompanying drawings.

Figure 1:
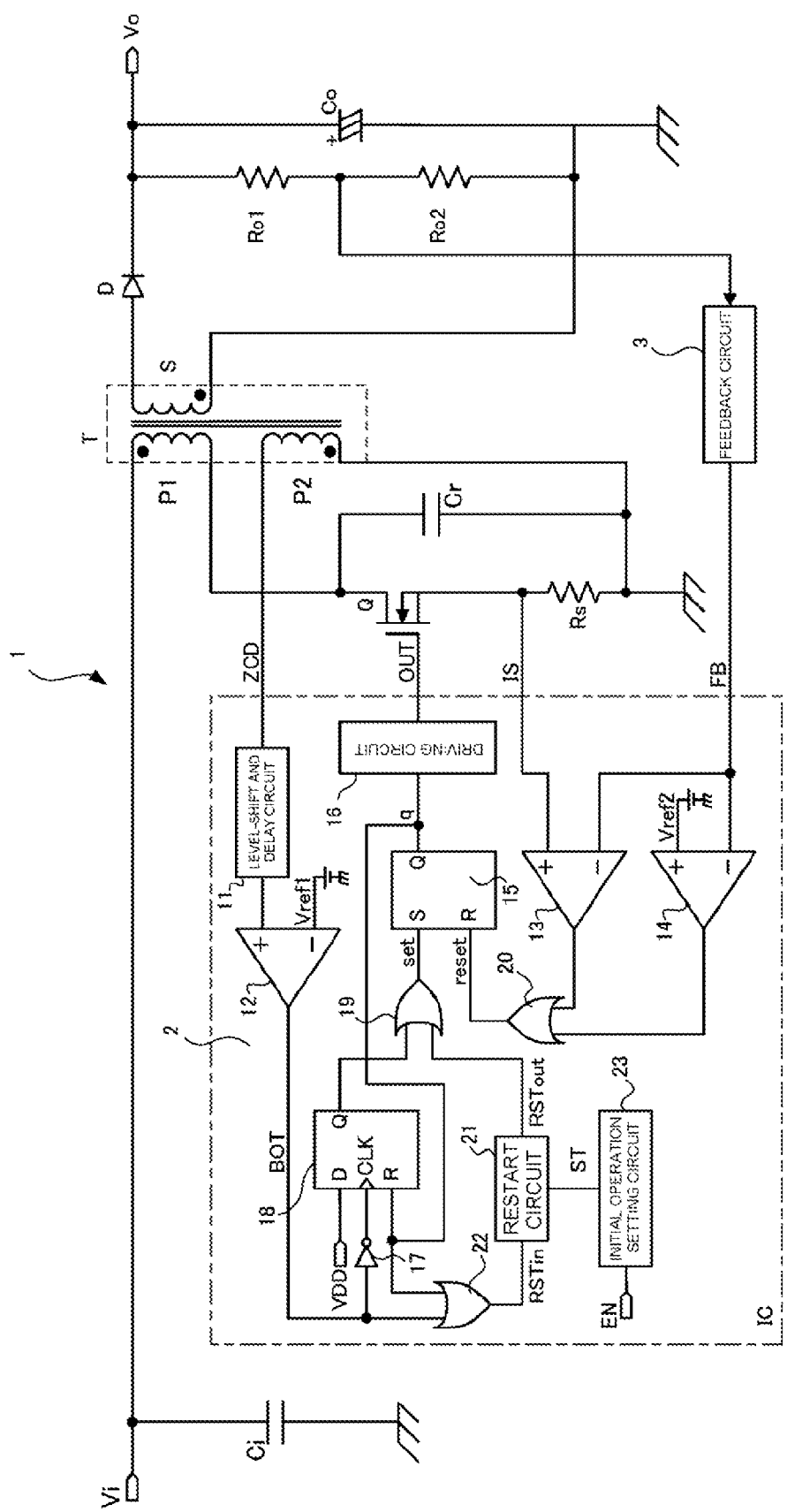
FIG. 1 is a schematic construction of a quasi resonance type switching power supply according to an embodiment of the present invention.
Figure 4:
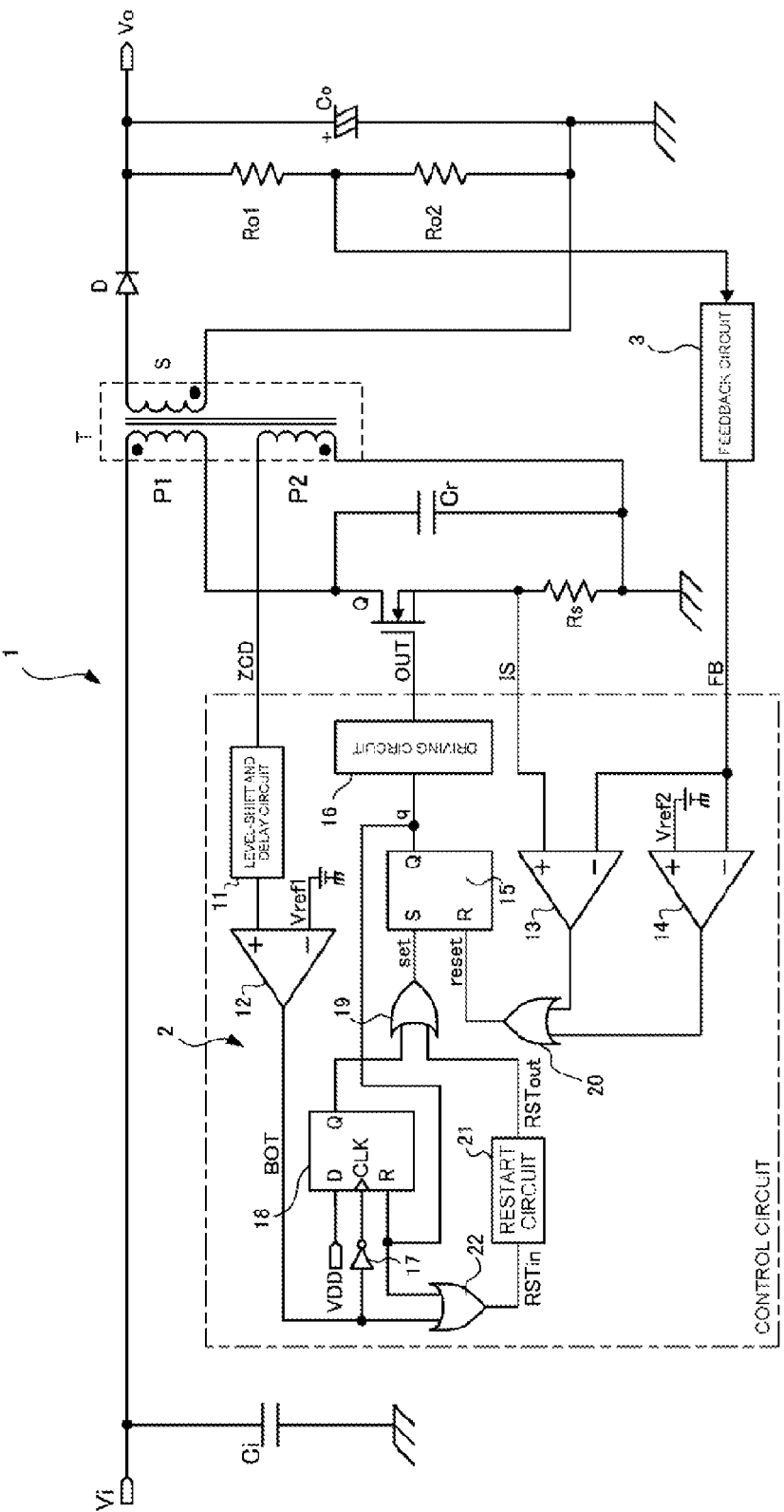
FIG. 4 is a schematic construction of a quasi resonance type switching power supply according to a conventional technology.
Figure 5:
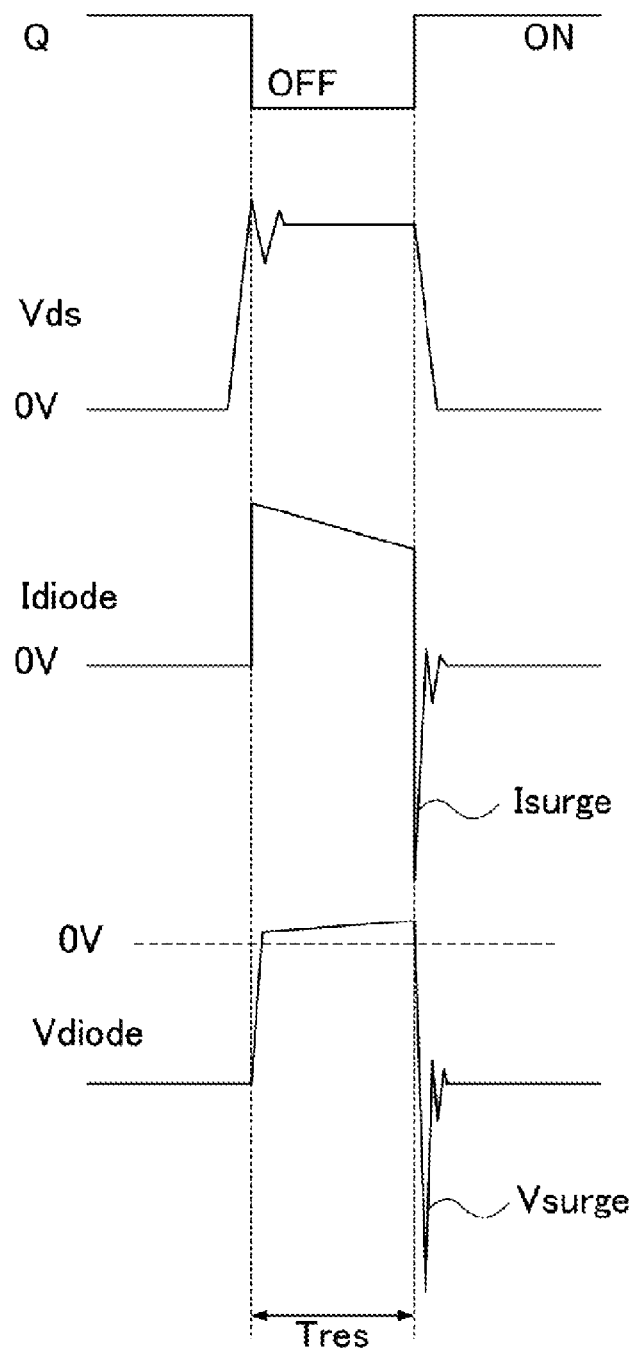
FIG. 5 shows waveforms for illustrating generation of surge voltage in a conventional power supply device.

FIG. 1 shows a schematic construction of a quasi-resonance type switching power supply, which is a switching converter, according to an embodiment of the invention. The similar parts as those of the conventional power supply of FIG. 4 are given the same symbol and repeated description is avoided.

The switching power supply of this embodiment features provision of an initial operation setting circuit 23 that sets the delay time Tres to be set in the restart circuit 21 to be longer during a predetermined period of time Tstart in a start up period of the power supply than in the normal operating period after the end of the startup period. The initial operation setting circuit 23 comprises a delay circuit that receives a device start up signal EN at the start of the power supply device and delivers an initial operation completion signal ST after the predetermined period of time Tstart, for example 3 ms.

The restart circuit 21 sets two times with different durations for the delay time Tres until delivery of the restart signal. A first time, for example 200 μs, is set during the initial operation period, the predetermined period of time Tstart, and is in effect during the initial operation period until the initial operation completion signal ST is given. The first time is determined based on anticipating a time Tdis for completion of discharging electric energy from the secondary winding S. A second time, for example 10 μs, is set as a delay time Tres that is in effect after receiving the initial operation completion signal ST, and is determined to be shorter than the first time.

Figure 2:
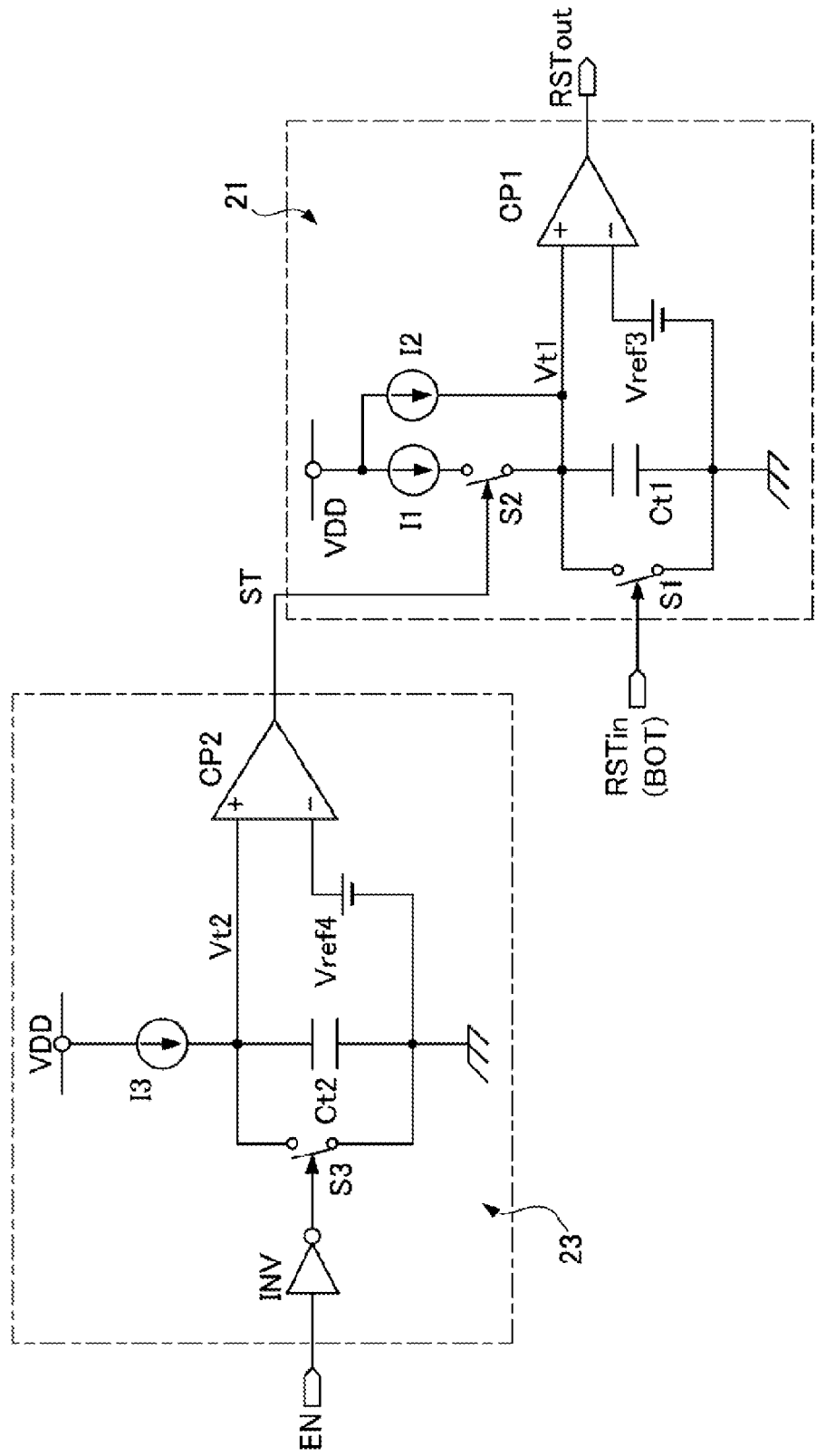
FIG. 2 is a circuit diagram of an example of construction of the restart circuit and an example of construction of the initial operation setting circuit indicated in FIG. 1.

More specifically, the restart circuit 21 and the initial operation setting circuit 23 are constructed, for example, as shown in FIG. 2 The restart circuit 21 comprises: a capacitor Ct1 charged by a first constant current source I1 and/or a second constant current source I2, a first switch S1 that receives the BOT signal and discharges the charges accumulated on the capacitor Ct1, and a second switch that receives the initial operation completion signal ST delivered by the initial operation setting circuit 23 and increases the magnitude of current for charging the capacitor Ct1.

The first switch S1, which can be a MOS-FET, is normally in an OFF state. When the BOT signal turns "H", or the RS flip-flop 15 is set to deliver an "H" signal, the first switch S1 is ON driven. The first switch S1, by an ON operation thereof, short-circuits the capacitor Ct1 to discharge the charges accumulated on the capacitor Ct1. Consequently, the capacitor Ct1 is charged only when the first switch S1 is in an OFF state, by the first constant current source I1 and/or the second constant current source I2.

The second switch S2, which can be a MOS-FET, is held in an OFF state while the initial operation completion signal ST is not given and turns ON when the initial operation completion signal ST is given. Consequently, the second switch S2 is held in an OFF state during the initial operation period, the predetermined period of time Tstart, until the initial operation completion signal ST is given, separating the first constant current source I1 from the capacitor Ct1. Therefore, in the startup period of the power supply device, the capacitor Ct1 is charged slowly, only by the current from the second constant current source I2.

The second switch S2 receives the initial operation completion signal ST and, after the start up process of the power supply device is completed and operation has proceeded to a normal operating state, keeps the ON state thereof connecting the first constant current source I1 to the capacitor Ct1. Therefore, in the normal operation after the end of the startup period, the capacitor Ct1 is charged rapidly with the current from both the first constant current source I1 and the second constant current source I2. This situation continues until the operation of the switching power supply device ends.

The restart circuit 21 comprises a comparator CP1 that compares the voltage Vt1 across the capacitor Ct1 charged and discharged as described above with a predetermined reference voltage Vref3, and generates and delivers the restart signal RSTout when the charged voltage Vt1 exceeds the reference voltage Vref3. During the predetermined period of time Tstart before the initial operation completion signal ST is given, the restart circuit 21 delivers the restart signal RSTout after the first time Tres1 is passed until the reference voltage Vref3 is surpassed by the charged voltage Vt1 of the capacitor Ct1 charged slowly by the second constant current source I2. In the normal operation after receiving the initial operation completion signal ST, the restart signal RSTout is delivered after the second time Tres2, which is shorter than the first time Tres1, has passed. In the second time Tres2, the reference voltage Vref3 is surpassed by the charged voltage Vt1 of the capacitor Ct1, which is charged rapidly by the first constant current source I1 and the second constant current source I2.

The initial operation setting circuit 23 comprises a capacitor Ct2 that is charged by a third constant current source I3 and a third switch S3 that is connected in parallel to the capacitor Ct2 and, in response to receiving the device start up signal EN through the inverter INV, discharges the charges accumulated on the capacitor Ct2. The third switch S3, which can be a MOS-FET, is in an ON state based on the output of the inverter INV in a normal state, and enters an OFF state upon receipt of the device start up signal EN.

Thus, the capacitor Ct2 is charged by the third constant current source I3 when the device start up signal EN is created internally with the start up of the switching power supply device. The charged voltage Vt2 of the capacitor Ct2 is delivered to the comparator CP2 and compared with a predetermined reference voltage Vref4. When the charged voltage Vt2 exceeds the reference voltage Vref4, the comparator delivers the initial operation completion signal ST.

The time period for the charging voltage Vt2 of the capacitor Ct2 to reach the reference voltage Vref4 depends on the charging time constant of the capacitor Ct2 and is determined based on estimating an initial operation time that is a time duration for the output voltage Vo in the device start up period to approach a specified voltage, for example to reach 90% of the rated voltage. The device start up signal EN, once delivered, continues throughout an operation period of the power supply device until stopping of the device. Consequently, the initial operation completion signal ST, which is delivered after passing the predetermined period of time Tstart from the start of the power supply device, also continues throughout the operation period of the device until stopping of the device.

In the switching power supply device comprising the initial operation setting circuit 23 and the restart circuit 21 having the construction as described above, the initial operation setting circuit 23 delivers the initial operation completion signal ST after passing the predetermined period of time Tstart, 3 ms for example, from the start of the device. Consequently, in the initial operation period from the start of the device until the predetermined period of time Tstart passes, the restart circuit 21 maintains the OFF state of the switch S2, and after passing the predetermined period of time Tstart, the switch S2 turns ON.

During the initial operation period, which is the predetermined period of time Tstart, 3 ms for example, from the start of the power supply device, the restart circuit 21 operates to deliver the restart signal after the first time Tres, 200 μs for example, from turning OFF of the switching element Q has passed. After the switching power supply device has transitioned to a normal operating state at the end of the initial operation period Tstart, the restart circuit operates to deliver the restart signal after the second time Tres, 10 μs for example, from turning OFF of the switching element Q has passed.

Figure 3:
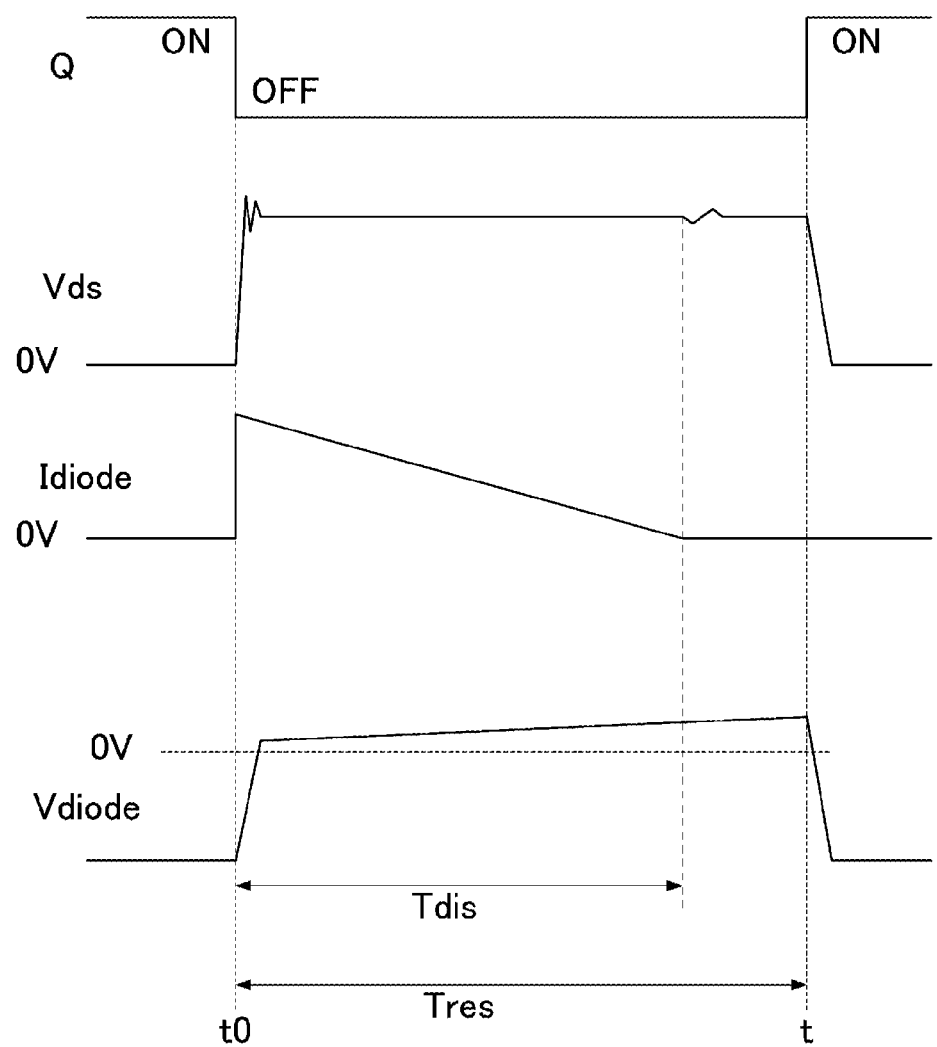
FIG. 3 shows waveforms for illustrating suppression of surge voltage.

Consequently, in the startup period of the device, the switching element Q never turns ON due to a restart signal in the state of uncompleted discharge of the electric energy from the secondary winding S of the isolation transformer T. As illustrated with the waveforms in FIG. 3, the switching element Q is controlled to turn ON in the initial operation period after passing the time Tdis for completion of discharge of the electric energy from the secondary winding S of the isolation transformer T triggered by turning OFF of the switching element Q. Therefore, the reverse recovery current does not flow in the rectifying diode D and the surge voltage is not generated.

After the charged voltage of the output capacitor Co, which is the output voltage Vo, has grown enough high and the switching power supply has entered a state of normal operation, the restart circuit 21 operates to deliver the restart signal after passing the second time Tres, 10 μs for example, from turning OFF of the switching element Q. As a consequence, even if abnormal decrease in the output voltage Vo occurs and the switching element Q is not able to turn ON from an OFF state, the restart signal is delivered rapidly to turn ON the switching element Q. Therefore, a quick transient response is ensured.

As described thus far, a switching power supply of the invention comprises a restart circuit 21 having a construction slightly changed to vary the delay time Tres and an initial operation setting circuit 23 comprising a delay circuit correspondingly devised. Although having a simple construction and without great change, the switching power supply of the invention suppresses generation of surge voltage Vsurge at the rectifying diode D and simultaneously ensures satisfactory transient response of the restart circuit 21 in a normal operation period, thus achieving compatibility between the surge voltage suppression and sufficient transient response.

The present invention is not limited to the embodiments described thus far. For example, the predetermined period of time Tstart, which is a delay time, set in the initial operation setting circuit 23 and the delay time Tres set selectively in the restart circuit 21 can be suitably determined based on any value corresponding to the capacitance of the capacitor Cr and the specifications of the power supply device. In addition, the restart circuit 21 and the initial operation setting circuit 23 allow various modifications.

Although the voltage undergone by the switching element Q is detected using the auxiliary winding P2 of the isolation transformer T in the above-described embodiment, a drain voltage of the switching element Q can be detected instead. Actually, however, high voltage of the drain voltage of the switching element Q needs some special means for detecting the voltage, and so it would be practical to employ the auxiliary winding P2 of the isolation transformer T. Moreover, any further modifications are possible within the scope and spirit of the invention.

What is claimed is:

1. A switching power supply comprising:
a switching element connected in series to a primary winding of an isolation transformer that receives an input voltage;
a resonance capacitor connected in parallel to the switching element;
an output capacitor connected to a secondary winding of the isolation transformer through a rectifying diode; and
a control circuit that turns the switching element ON to store electric energy into the isolation transformer, then turns the switching element OFF to discharge the electric energy stored in the isolation transformer from the secondary winding of the isolation transformer, and operates to deliver an output voltage rectified and smoothed through the rectifying diode and the output capacitor;
the control circuit including;
a bottom voltage detecting circuit that detects a bottom of a voltage and delivers a bottom detecting signal, wherein the voltage develops in the isolation transformer due to resonant oscillation caused by a leakage inductance of the isolation transformer and a capacitance of the resonance capacitor after discharge of the electric energy from the secondary winding;
a current comparator that delivers a reset signal when a voltage level corresponding to a current flowing through the switching element reaches a feedback voltage level corresponding to the output voltage of an output circuit;
a flip-flop that is set by the bottom detection signal or a restart signal and reset by the reset signal, and generates a driving signal for ON/OFF driving the switching element;
a restart circuit that is reset when the flip-flop is set or the bottom detection signal is delivered, and starts operation when the flip-flop is reset in a condition without input of the bottom detection signal, thereby delivering the restart signal after a predetermined time has passed; and
an initial operation setting circuit that sets a delay time in the restart circuit to be longer during a predetermined period of time in a start up period of the power supply than a delay time in a normal operation time after an end of the startup period.

2. The switching power supply according to claim 1, wherein
the initial operation setting circuit comprises a delay circuit that delivers an initial operation completion signal after the predetermined period of time from receiving a device starting signal has passed; and
the restart circuit sets a first time determined based on anticipating a time required for completion of discharging of electric energy from the secondary winding as the delay time, wherein the first time is in effect from a moment of delivering the restart signal in the initial operation period until receiving the initial operation completion signal, and the restart circuit sets a second time shorter than the first time as the delay time, wherein the second time is in effect from a moment of delivering the restart signal after receiving the initial operation completion signal.

3. The switching power supply according to claim 2, wherein the restart circuit comprises:
a capacitor that is charged by a constant current source;
a first switch that receives the bottom detection signal and discharges charges accumulated on the capacitor;
a comparator that generates the restart signal when a charged voltage across the capacitor exceeds a predetermined reference voltage; and
a second switch that receives the initial operation completion signal and increases an amount of current for charging the capacitor.

4. The switching power supply according to claim 2, wherein the initial operation setting circuit determines, as the predetermined period of time, a time based on anticipating an initial operation time in which the output voltage in the startup period approaches a rated output voltage.

5. The switching power supply according to claim 1, wherein the bottom voltage detecting circuit detects a bottom of an oscillating voltage generated in the isolation transformer by means of a voltage developed in an auxiliary winding of the isolation transformer.

6. A control device for a power supply, comprising:
a restart device configured to output a restart signal to a switching element of the power supply, following one of a first delay period or a second delay period,
wherein
the first delay period occurs during an initial operation period following a start-up of the power supply,
the second delay period occurs during a normal operation period following the initial operation period, and
the second delay period is shorter than the first delay period.

7. The control device of claim 6, wherein the first delay period is determined at least in part by a charging time of a first capacitor in response to a first charging current.

8. The control device of claim 7, wherein the second delay period is determined at least in part by the charging time of the first capacitor in response to the first charging current in combination with a second charging current.

9. The control device of claim 7, further comprising:
an initial operation setting device configured to output an initial operation completion signal indicating completion of the initial operation period to the restart device, based at least in part on a charging time of a second capacitor in response to a third charging current.

10. The control device of claim 9, wherein the charging time of the second capacitor corresponds to a time period required for an output voltage of the power supply to reach a specified level.

* * * * *